(12) United States Patent
Nagasaki (10) Patent No.: US 7,787,046 B2
(45) Date of Patent: Aug. 31, 2010

(54) VOICE COIL MOTOR

(75) Inventor: Yasumasa Nagasaki, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 379 days.

(21) Appl. No.: 12/071,035

(22) Filed: Feb. 14, 2008

(65) Prior Publication Data

US 2008/0198254 A1  Aug. 21, 2008

(30) Foreign Application Priority Data

Feb. 15, 2007  (GB) .................................. 0702897.0

(51) Int. Cl.
*H04N 5/225* (2006.01)
(52) U.S. Cl. ..................................................... 348/374
(58) Field of Classification Search ................. 348/335, 348/374
See application file for complete search history.

(56) References Cited

U.S. PATENT DOCUMENTS

| 7,262,927 | B1 * | 8/2007 | Shyu et al. | 359/823 |
| 7,477,462 | B2 * | 1/2009 | Shyu et al. | 359/824 |
| 2005/0243444 | A1 * | 11/2005 | Takeshita et al. | 359/819 |
| 2006/0028929 | A1 * | 2/2006 | Osaka | 369/44.14 |
| 2006/0275032 | A1 * | 12/2006 | Hong et al. | 396/439 |

FOREIGN PATENT DOCUMENTS

| CN | 1333473 A | 1/2002 |
| JP | 2005-128405 A | 5/2005 |
| JP | 2006-58662 A | 3/2006 |

* cited by examiner

*Primary Examiner*—James M Hannett
(74) *Attorney, Agent, or Firm*—Birch, Stewart, Kolasch & Birch, LLP (57) ABSTRACT

A voice coil motor lens module has a two part casing accommodating a magnet housing of annular form with an outer wall and an inner wall joined by a top wall. One or more magnets producing a magnetic field, are fitted to the inner surface of the outer wall. A lens holder, for supporting a lens, has a coil fitted to an outer surface thereof and is suspended by a pair of springs such that the coil is disposed within the magnetic field. The lens holder has an inner bore and an axially upper end. The inner wall extends into the inner bore of the lens holder and the upper end of the lens holder rests, in a park position, against an upper cushion fixed to an inner surface of the top wall. In use, current passing through the coil moves the lens holder downwardly to focus an image on an image sensor below the lens holder. At a fully extended position, the lower end of the lens holder rests against a lower cushion fixed to the casing.

25 Claims, 6 Drawing Sheets

VOICE COIL MOTOR

CROSS-REFERENCE TO RELATED APPLICATIONS

This non-provisional patent application claims priority under 35 U.S.C. §119(a) from Patent Application No. 0702897.0 filed in Great Britain on 15 Feb. 2007.

BACKGROUND OF THE INVENTION

Lens modules, especially autofocus lens modules, have a lens holder to which is mounted a single lens or lens assembly, simply referred to herein as a lens, for focussing an image onto an image plane. In use, the image plane would be an image sensor such as a CMOS or CCD device but in practice, the lens module is produced bare, meaning without the lens and without the image sensor which are fitted by the camera module maker. The lens module has a lens holder which is arranged to be driven by an actuator along a short straight path. Known actuators include DC motors, stepping motors, voice coil motors, ultrasonic motors and electrostrictive actuators including piezoelectric actuators.

There is a strong demand for small lens modules as small camera modules are being incorporated into more devices such as mobile phones and laptop computers and computer monitors. At the same time, the desire is for lower price and smaller size.

Voice coil motor driven lens modules have an advantage in price and as the size is reduced, provides satisfactory performance over a limited range of motion. Recent developments are shown, for example, in Japanese Patent Applications JP 2006-58662 and JP 2005-128405 by Shicoh Engineering Company Ltd.

One problem with current voice coil motor driven modules is that it is difficult to further reduce the overall size of the module, yet maintain the lens size and still improve the performance, in particular, the response time of the module to achieve focus from a resting position.

Another problem with small lens modules is that the lens is not securely mounted within the module and can be damaged due to shocks received by dropping the module or from operating in high or severe vibration conditions.

SUMMARY OF THE INVENTION

Thus, it is an object of the present invention to provide a lens module which can be made smaller and has a fast response time.

Another object is to provide a lens module which is more robust and able to better handle shocks associated with falls and vibration.

Accordingly, in one aspect thereof, the present invention provides a lens module for a camera or the like, comprising:
 a two part casing containing a magnet housing, permanent magnet means for providing a magnetic field, a lens holder for supporting a lens, and a coil fixed to an outer surface of the lens holder;
 the casing having an upper case and a lower case;
 the magnet housing having an annular shape formed by a round cylindrical outer wall and a round cylindrical inner wall concentric with the outer wall and joined at an upper end by a top wall, the lower end being left open and the axial length of the inner wall being less than that axial length of the outer wall, the permanent magnet means comprises at least one permanent magnet fitted to an inner surface of the outer wall;
 the lens holder having a through aperture defining an optical axis, the through aperture being arranged to accommodate the lens, the lens holder having an upper end and a lower end, the radially outer surface of the lens holder includes a flange located towards the lower end, the through aperture of the lens holder having a stepped bore such that an upper portion of the bore has a greater diameter than a lower portion, the lens holder being insertable in the magnet housing such that the inner wall of the magnet housing confronts the upper portion of the bore; an upper cushion is fixed to an inner surface of the top wall of the magnet housing and located to prevent direct contact between the upper end of the lens holder and the top wall of the magnet housing, defining a park position for the lens holder;
 the lens holder being supported by two springs which engage the lower end of the lens holder and the lower case to resiliently support the lens holder for movement along the optical axis and biasing the lens holder upwardly into contact with the upper cushion,
 the coil sits on an axially upper surface of the flange and is disposed within the magnetic field of the permanent magnet means whereby current passing through the coil generates a magnetic field which reacts with the magnetic field of the permanent magnet means to cause the coil to press downwardly on the flange and move the lens holder against the force of the springs.

Preferably, the springs are electrically conductive and lead wires from the coil connect to a source of electrical power via the springs.

Preferably, the springs form electrical terminals for the module.

Preferably, the springs are leaf type springs.

Preferably, each spring has a flat form with an inner edge fixed to the lens holder, an outer edge fixed to the lower case and at least one serpentine finger extending between the inner and outer edges.

Preferably, the outer edge of the spring is pressed to the lower case by the magnet housing through an insulating ring.

Preferably, the lower end of the lens holder is stepped and has non-stepped portions which separate the inner edges of the springs.

Preferably, the flange of the lens holder has two grooves for passage of the lead wires of the coil to the springs.

Preferably, the upper portion of the bore of the lens holder has a plurality of axially extending ribs which confront the radially outer surface of the inner wall of the magnet housing across a small air gap to limit tilting of the upper axial end of the lens holder.

Preferably, the ribs extend axially the full length of the upper bore portion.

Preferably, the ribs extend axially for half of the length of the upper bore portion.

Preferably, the upper case and the lower case clamp the magnet housing there between.

Preferably, the upper case and lower case have interconnecting legs which join the two cases together.

Preferably, the legs of the lower case have an inner vertical groove, the springs have tabs which extend into the grooves and the legs of the upper case have fingers which extend into the grooves and press the tabs against the lower case.

Preferably, the upper case and lower case are fixed together by adhesive.

Preferably, a lower cushion is fixed to the lower case and arranged to prevent the lower end of the lens holder from making direct contact with the lower case in the fully extended position.

Preferably, the upper and lower cushions are formed from a cushion material having a density which is less than the density of the lens holder.

Preferably, wherein the cushion material is an elastomeric material.

Preferably, the inner wall and top wall of the magnet housing are joined by a tapered region allowing a wider angle of light to reach the lens being carried by the lens holder.

Preferably, the springs are magnetic and are attracted to the permanent magnet means to provide a greater force on the lens holder when the lens holder is in the park position.

Preferably, the springs provide minimal force on the lens holder when the lens holder is in the park position, i.e., when the lens holder contacts the upper cushion.

Preferably, the lens holder has magnetic objects attached thereto at locations which assist the springs in holding the lens holder against the cushion by magnetic force attraction with the magnet means.

Preferably, the lens holder is of a material exhibiting magnetic properties.

Preferably the lens holder has auxiliary magnets arranged to be magnetically attracted to the magnet housing when the lens holder is in the park position.

Preferably the auxiliary magnets are disposed in the upper end of the lens holder and are magnetically attracted to the top wall when the lens holder is in the park position.

BRIEF DESCRIPTION OF THE DRAWINGS

One preferred embodiment of the invention will now be described, by way of example only, with reference to the accompanying drawings, in which.

DETAILED DESCRIPTION OF THE PREFERRED EMBODIMENT

Figure 1:
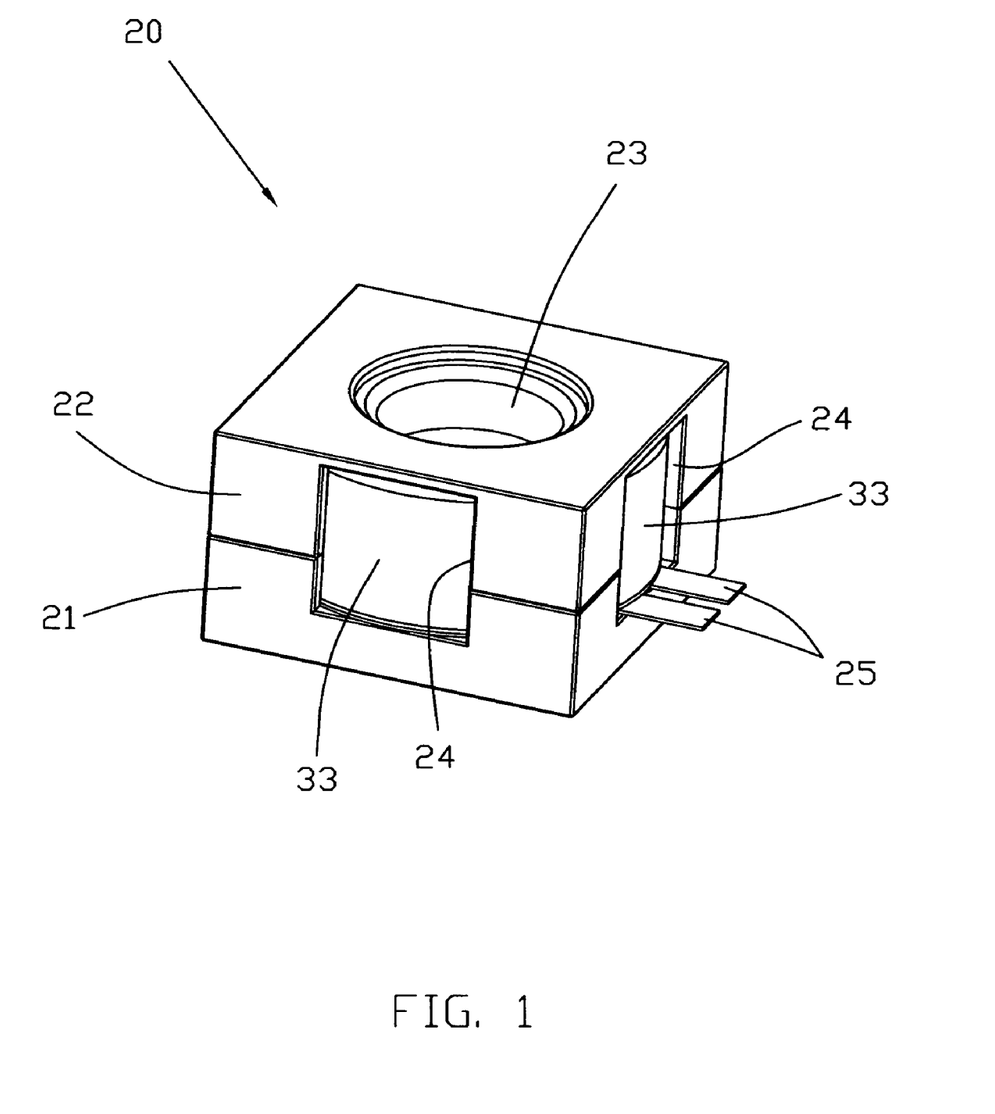
FIG. 1 is a perspective view of a lens module according to a preferred embodiment of the present invention.
Figure 2:
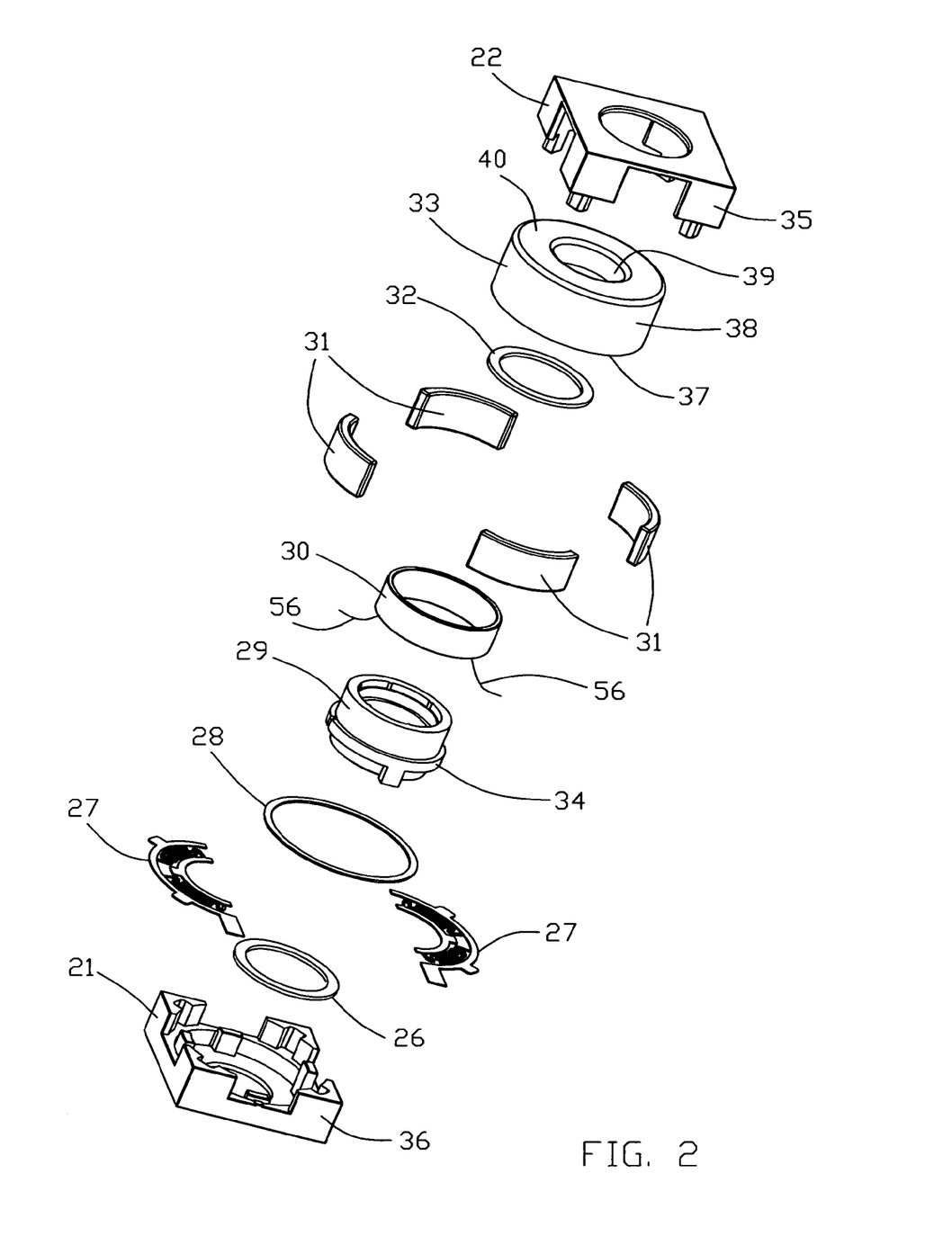
FIG. 2 is an exploded view of the module of FIG. 1.

The preferred lens module 20 is shown assembled in FIG. 1 and exploded in FIG. 2. The outer appearance of the module 20 is like a squat square box measuring 8.5 by 8.5 by 5 mm. The module 20 has a two part casing with a lower case 21 and an upper case 22. The upper case 22 has a central hole 23 through which light for an image to be captured can pass. Additional openings 24 are formed in each side, formed by cutouts in the joining edges of the upper and lower cases. Through one of the side openings, two terminals 25 protrude for connecting the module 20 to a source of power. A magnet housing 33 can be seen through the side openings 24.

Referring to the exploded view of FIG. 2, the components of the module 20 will be named starting from the bottom. At the bottom is the lower case 21. Fixed to the floor of the lower case 21 is a lower cushion 26. Fitted or placed into the lower case are two springs 27. An insulating ring 28 is placed on top of an outer edge of the springs 27. A lens holder 29 is supported by an inner edge of the springs 27. A coil 30 surrounds the lens holder 24 and sits on a flange 34 of the lens holder 29. The coil has two lead wires 56 Four arcuate magnets 31 provide the permanent magnet field and when fitted together, form a magnet ring. The magnets 31 are fitted inside the magnet housing 33. An upper cushion 32 is fixed to an upper inner surface of the housing 33. The upper case 22 presses the housing 33 to the lower case 21 capturing the springs 27 and the insulating ring 28 therebetween and has four legs 35, one at each corner, which mate with four legs 36 extending upwardly from the corner of the lower case 21, thereby enclosing the housing 33.

Figure 3:
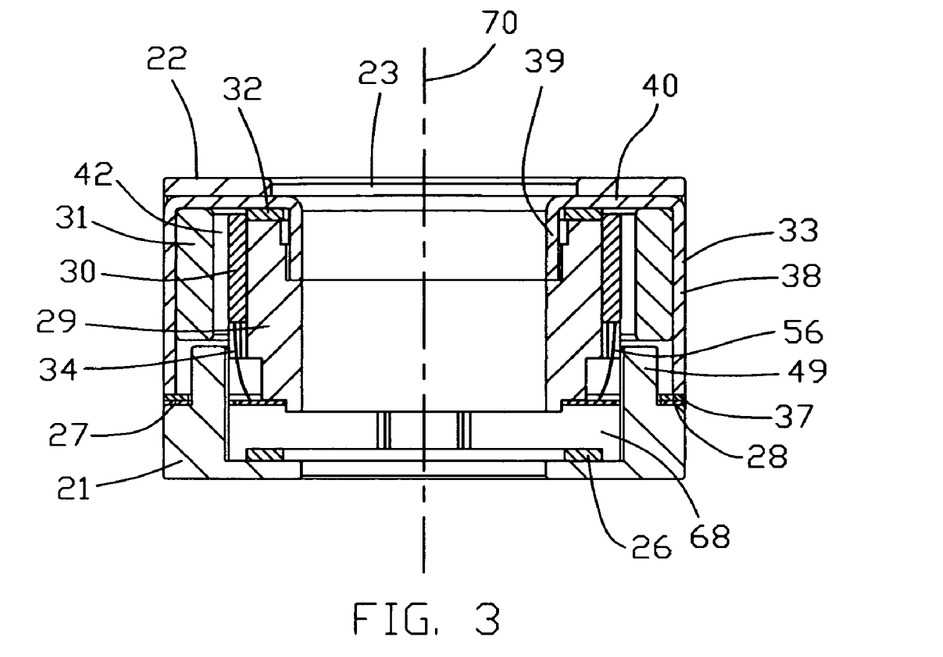
FIG. 3 is a sectional view of the module of FIG. 1.
Figure 4:
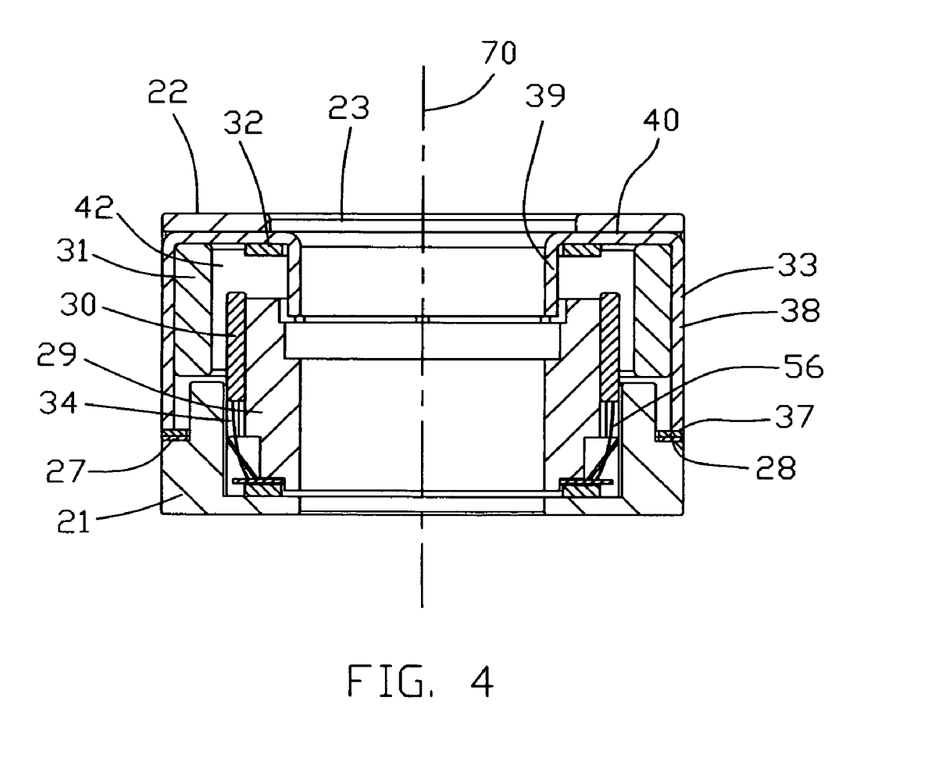
FIG. 4 is a sectional view of the module, similar to FIG. 3, with a part in an alternate position.

FIGS. 3 and 4 show the module in assembled form in sectional view. In FIG. 3, the lens holder 29 is in the rest position or parked position with the lens holder 29 pressing against the upper cushion 32 fixed to the housing 33. In FIG. 4, the lens holder 29 is shown in the fully extended position as would be the case when the lens module is focussing on a very close object. In this position, the lens holder 29 is shown pressing against the lower cushion 26. In operation, the lens holder moves from the rest position downwardly towards the lower case to focus the image, moving along the optical axis 70 which is vertical as shown in FIGS. 3 and 4. When in the fully extended position, the lens holder 29 is at its closest position to the lower case 21. Thus, in use, the lens or lens holder 29 never extends further from the case than it does in the parked position, maintaining the lens protected at all time. In the fully extended position, the lens holder 29 may touch the lower case 21. However, in the preferred embodiment, in the fully extended position, the lens holder 29 contacts the lower cushion 26 preventing direct contact with the lower case 21.

As can be seen in FIGS. 2, 3 and 4, the housing 33 is annular with an outer wall 38 and an inner wall 39. The inner and outer walls are right cylindrical and concentric. The upper end of the housing is closed by a top wall 40 extending between the inner and outer walls 39, 38. The housing 33 is annular and open towards the bottom and the outer lower edge 37 of the outer wall 38 presses against the insulation ring 28. The axial height of the outer wall 38 is greater than the axial height of the inner wall 39, more than twice as high. The inner wall 39 of the housing 33 extends into the lens holder 39. The upper cushion 32 is fixed to an inner surface of the end wall of the housing and provides a buffer between the housing 33 and an upper end 41 of the lens holder 29. The magnets 31 are fitted to the inner surface of the outer wall 38 of the housing 33 and abut the inner surface of the end wall 40.

Coil 30 is located inside the ring formed by the magnets 31, facing the magnets across a small air gap 42 and is fixed on a radially outer surface of the lens holder 29. The lens holder 29 itself is a close clearance fit with the radially outer surface of the inner wall 39 of the housing 33. As can be seen, the inner wall 39 of the housing 33 is substantially shorter than the outer wall 38 of the housing. It can also be seen that the inner diameter of the housing 33 is substantially the same as the inner diameter of the lens holder 29 with the inner surface 44 of the lens holder 29 being stepped to receive the inner wall 39 of the housing 33.

Figure 5:
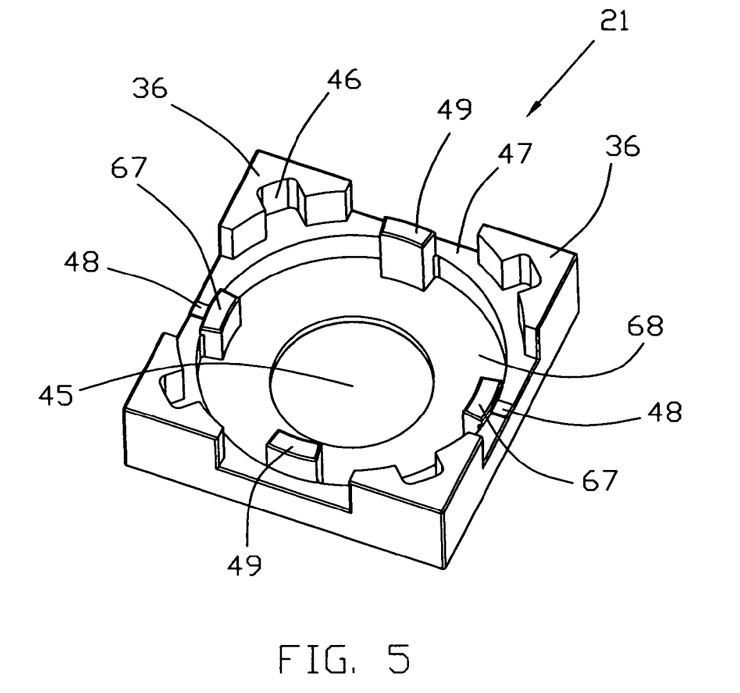
FIG. 5 is a perspective view of a lower case, being a part of the module of FIG. 1.

The lower case 21, as shown in FIG. 5, also has a central opening 45 through which the focussed image from the lens projects onto an image sensor which is to be mounted below the module. At the corners of the lower casing 21 are upwardly extending legs 36 arranged to mate with the legs 35 from the upper casing 22. The legs are U-shaped in cross section forming a vertical groove 46 in the legs 36. A peripheral step 47 forms a seat for the springs 27. In two of the windows formed between the legs 36, there is a small projection 48 for separating the springs 27. The lower case 21 has an internal void into which, in use, the springs 27 and lens holder 29 moves in order to focus the image through the lens. Projections 49 are formed on an inner surface of the lower case and equally spaced, form support stops for the magnets. Projections 67 are formed on the inner surface of the lower case circumferentially spaced between projections 49. Projections 49 and projections 67 receive therebetween the flange 34 of the lens holder 29 and support the lower portion of the lens holder against lateral movement.

Figure 6:
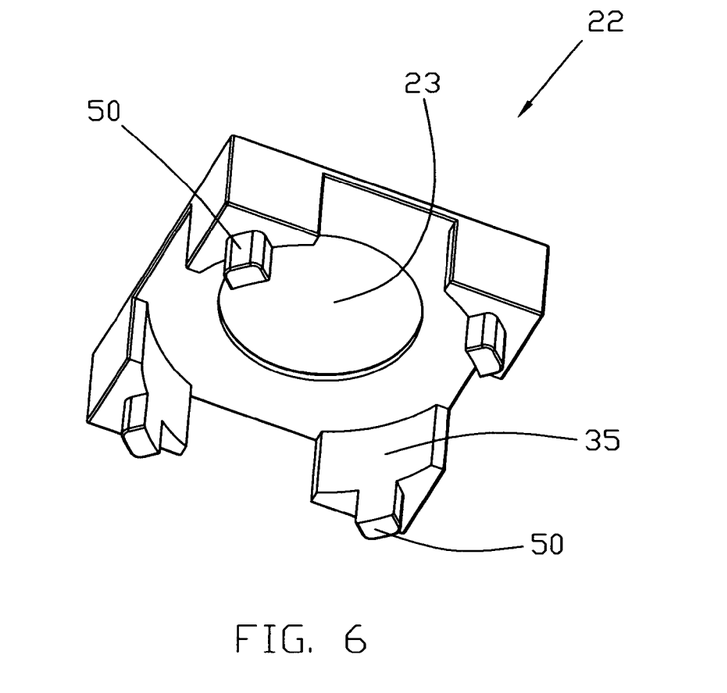
FIG. 6 is a perspective view of an upper case, being a part of the module of FIG. 1.

The upper case 22, as shown in FIG. 6, has a flat upper surface with a central opening 23 and four legs 35 extending downwardly from each corner. Each leg 35 has a downwardly extending finger 50 which is received in a respective one of the vertical grooves 46 formed in the legs 36 of the lower case 21 for interlocking the two casings 21, 22. The fingers 50 also press against tabs 51 of the springs 27 which locate in the grooves 46, thereby fixing the springs 27.

Figure 7:
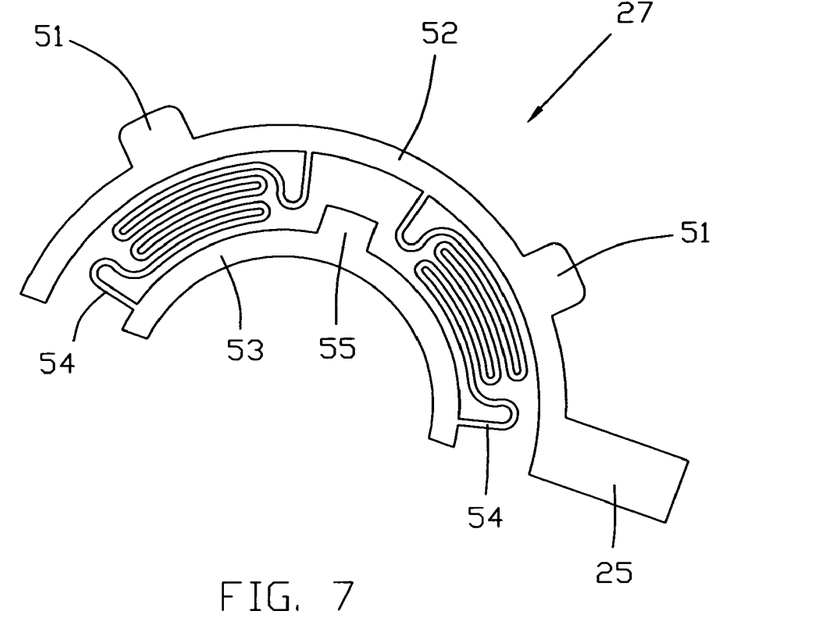
FIG. 7 is a plan view of a spring, being a part of the module of FIG. 1.

FIG. 7 illustrates one of the springs 27. The other spring is a mirror image. The spring 27 has a semi-circular appearance so that when the two springs are laid side by side, they form a complete circle with just a small gap therebetween in which the projections 48 on the lower case fit. The springs 27 have a broad outer edge 52 and a broad inner edge 53 joined together by two thin serpentine leaves or fingers 54. The springs are made of a resilient, electrically conductive material such as beryllium copper. The outer edge 52 has an integral terminal 25 and two laterally extending tabs 51 which fit into the grooves 46 of the legs 36 of the lower case 21 as mentioned above. The inner edge 53 of the spring 27 also has a outwardly extending tab 55 to which a lead 56 from the coil 30 is fixed, optionally by spot welding. Adhesive is used to fix the springs 27 to the lens holder 29. The inner edge 53 of the two springs 27 forms a support collar on which the lens holder 29 sits.

Figure 8:
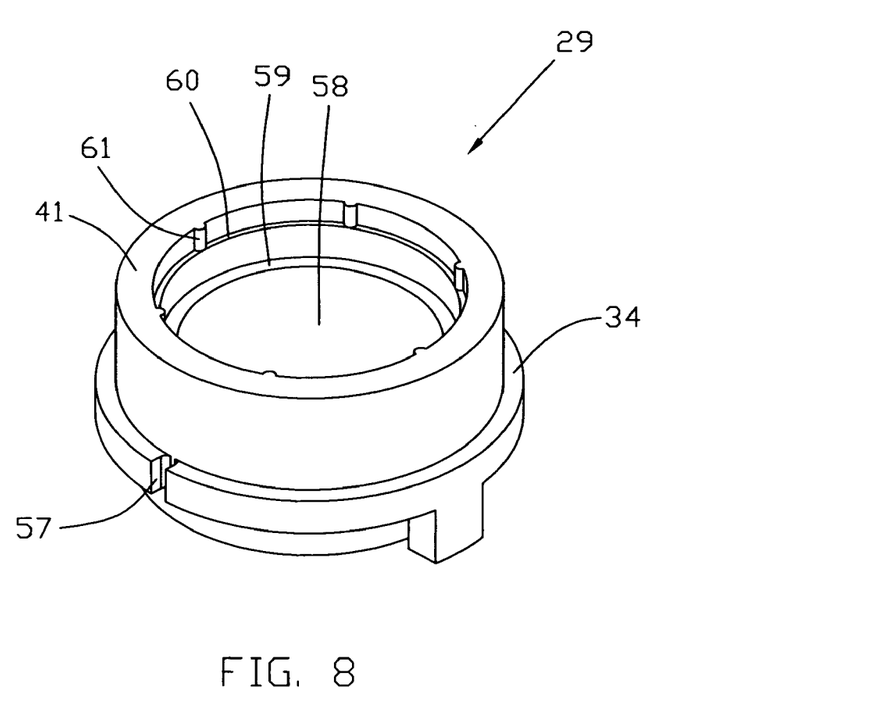
FIG. 8 is a perspective view of a lens holder, being a part of the module of FIG. 1.
Figure 9:
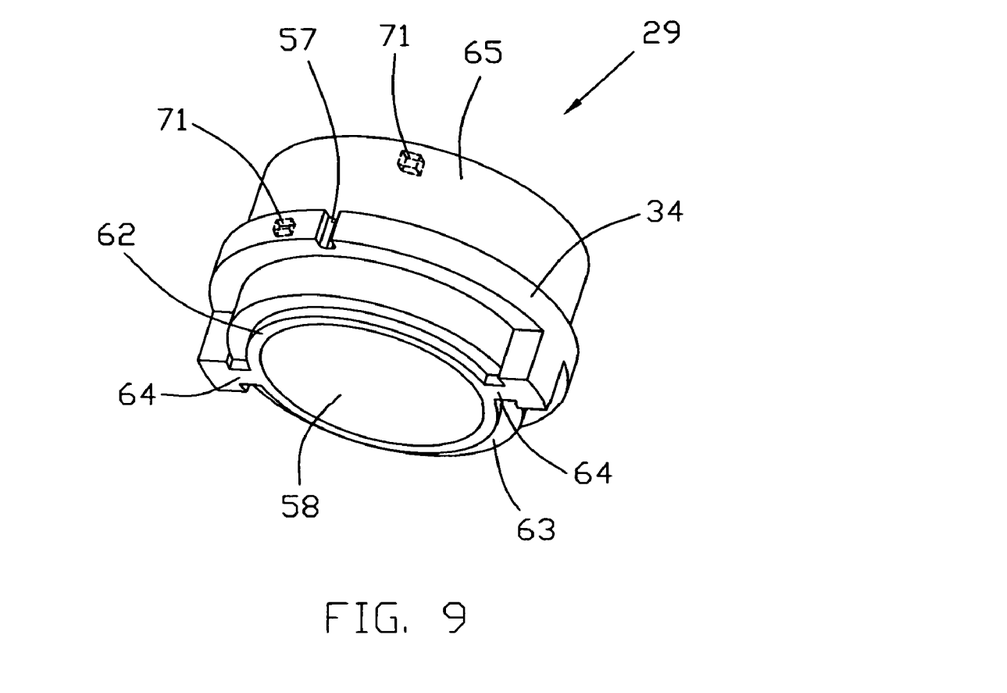
FIG. 9 is a perspective view of a lower side of the lens module of FIG. 8.

The lens holder 29 is shown in perspective view in FIG. 8 and in perspective view from below in FIG. 9. The lens holder 29 is basically tubular with an outer flange 34 on which the coil 30 sits and a stepped inner bore as mentioned above. The flange 34 is located towards the bottom of the lens holder 29 and has two gaps 57 through which the lead wires 56 from the coil 30 extend down to the springs 27. The lens holder 29 has a through opening 58 defining the optical axis 70. The through opening 58 accommodates the lens (not shown). The inner surface or bore of the lens holder 29 is predominantly right cylindrical with two steps at the upper end 41. The inner first stepped portion 59 is arranged to receive the inner wall 39 of the housing 33 with a slight clearance. The outer second stepped 60 has a greater clearance but within the step are six axially extending ribs 61. The radial height of the ribs 61 is slightly less than or equal to the width of the second step 60 and thus, the ribs 61 form a low friction guide against the inner wall 39 of the housing 33, should the lens holder 29 tilt or move sideways during use. There is a slight clearance between the ribs 61 and the inner wall 39 of the housing 33, this clearance being the same or slightly more than the clearance of the first stepped portion 59.

On the lower end 62 of the lens holder 29, there is a step 63 on the outer surface. Step 63 provides a seat for the springs 27. The inner edge 53 of the springs are glued to the axial face of step 63. Two projections 64 cut the step 63 into two portions and locates and separates the inner edges 53 of the springs 27. This arrangement keys the springs 27 to the lens holder 29.

The coil 30, as shown in FIG. 2, is a ring formed by a number of turns of copper wire which may be mounted directly onto the outer surface 65 of the lens holder but preferably is a free standing ring which is pressed onto the outer surface 65 of the lens holder and sits on flange 34. As a free standing ring, the coil 30 may be bound in insulating material and is preferably, impregnated with a resin which holds the turns of the wire together to form a rigid coil. Optionally, the coil 30 is fixed to the lens holder 29 by adhesive. The ends of the coil 30, known as lead wires 56, connect to the springs 27.

As shown in FIGS. 2 and 3, a ring of insulating material 28 is placed on top of the springs 27 in the lower case 21 allowing the housing 33 to press the outer edge 52 of the springs 27 against the lower case 21 without short-circuiting the springs 27. The housing 33 is made of a magnetic material and stainless steel is preferred to resist corrosion. The upper end 41 of the lens holder 29 and coil 30 extend into the annular space formed between the inner 39 and outer 38 walls of the housing 33. An annular ring 32 of low density material, preferably elastomeric material such as foam rubber, is fixed to the inner surface of the closed end of the housing to act as a cushion or buffer between the lens holder 29 and the housing 33.

Figure 10:
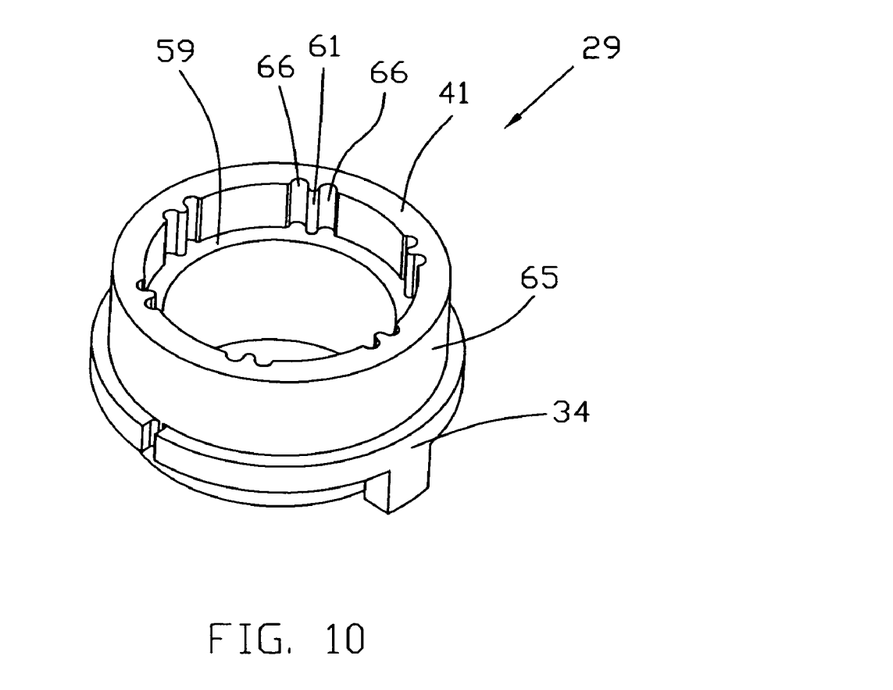
FIG. 10 is a perspective view of an alternative lens holder.

A modified lens holder is shown in FIG. 10. In this lens holder 29, the inner surface portion facing the inner wall 39 of the housing 33 has been modified. This surface is no longer stepped and the ribs 61 extend axially along the entire surface from the axial end 41 of the holder to the step 59 for the section receiving the optical lens. As the radial height of the ribs 61 is very small, and the thickness of the holder is very small, the ribs have grooves 66 along either side which emphasize the ribs 61. This makes the molding easier and prolongs the life of the mold.

In use, a lens, being an assembly of any number of lens fitted together or a single lens, is fitted to the bore of the lens holder. The lens module is placed on an image sensor assembly such as a CCD or CMOS image sensor and the lens assembly is moved by moving the lens holder in accordance with control signals from the image sensor controller. The position of the lens holder is controlled by applying current through the coil. As the permanent magnets provide a stationary magnetic field, any current passing through the coil will cause a magnetic force to be generated on the coil, which in turn will apply a force to the lens holder against the force exerted by the springs. The greater the current through the coil, the greater the force being generated and the greater the movement of the lens holder. With no current flowing through the coil, the lens holder is pressed against the upper cushion by the springs in what is known as the rest or park position. The force applied by the springs in the rest position can be adjusted to provide a desired holding force of the lens holder against the cushion. As the current increases in the coil, the lens holder is moved towards the lower case until maximum travel is reached, at which point, the lens holder is being pressed against the lower case, a lower cushion on the lower case or the maximum extension of the springs.

The force with which the lens holder is moved depends upon the magnetic forces created between the magnet and the coil. The more powerful the magnet or the greater the number of turns on the coil or a greater current flow through the coil leads to a greater force. The strength of the springs and the mass of the lens holder assembly including the coil and lens assembly, will affect the force required to move the lens and also the speed at which the lens will move. The lighter the lens holder assembly, the faster the response time and thus, quicker the camera module will achieve focus.

By having springs only at the lower end of the lens holder, the height of the lens holder and thus, the height of the lens module, can be made shorter by eliminating the top spring and attachments for the top spring.

By extending the housing to the inner surface of the lens holder, the outer diameter of the housing can be made smaller by eliminating the need for a space between the coil and the lens holder for receiving the inner wall of the housing. This also allows the lens holder to be made lighter and the coil to be better supported by the lens holder.

While the preferred embodiment has a cushion to support the lens holder in the parked position and a cushion to support the lens holder in the fully extended position, it should be remembered that the cushion for supporting the lens in the fully extended position is optional and would not be used in a low cost version as the occurrence of severe vibration or shock when the lens holder is in the fully extended position, i.e., when taking a close up photograph, is considered very unlikely.

The springs 27 are desirably designed to exert very little pressure on the lens holder in the parked position, almost zero force, to give a very rapid response time to current through the coil. This may lead to holding problems in the park position. To overcome this, magnetic pieces may be attached to or embedded in the lens holder which react with the permanent magnetic field to cause a force of magnetic attraction to assist holding the lens holder in the park position. Indeed, other parts may have magnetic properties to aid park holding force. For example, instead of springs of beryllium copper, springs of a conductive resilient and magnetic material may be used, e.g., stainless steel, such that in the park position, the springs provide little to no spring force against the lens holder but a magnetic force acting through the springs assist holding or entirely holds the lens holder in the park position. Alternatively, small magnets may be fitted to or embedded within the lens holder so as to have a magnetic attraction to the inner wall or top wall of the housing in the park position. These magnet or magnetic pieces are represented schematically in FIG. 9 by dotted lines 71 in the flange 34.

Also, as suggested in FIG. 1 but not shown in FIGS. 3 and 4, the connection between the inner wall and the top wall could be beveled, e.g., by using an exaggerated radius or flattened corner, whereby a greater amount of light can be passed to the lens carried by the lens holder, by slightly increasing the image capture angle.

The embodiment described above is given by way of example only and various modifications will be apparent to persons skilled in the art without departing from the scope of the invention as defined in the appended claims.

The invention claimed is:

1. A lens module for a camera or the like, comprising:
a two part casing containing a magnet housing, permanent magnet means for providing a magnetic field, a lens holder for supporting a lens, and a coil fixed to an outer surface of the lens holder;
the casing having an upper case and a lower case;
the magnet housing having an annular shape formed by a round cylindrical outer wall and a round cylindrical inner wall concentric with the outer wall and joined at an upper end by a top wall, the lower end being left open and the axial length of the inner wall being less than that axial length of the outer wall;
the permanent magnet means comprises at least one permanent magnet fitted to an inner surface of the outer wall;
the lens holder having a through aperture defining an optical axis, the through aperture being arranged to accommodate the lens, the lens holder having an upper end and a lower end, the radially outer surface of the lens holder includes a flange located towards the lower end, the through aperture of the lens holder having a stepped bore such that an upper portion of the bore has a greater diameter than a lower portion, the lens holder being insertable in the magnet housing such that the inner wall of the magnet housing confronts the upper portion of the bore;
an upper cushion is fixed to an inner surface of the top wall of the magnet housing and located to prevent direct contact between the upper end of the lens holder and the top wall of the magnet housing, defining a park position for the lens holder;
the lens holder being supported by two springs which engage the lower end of the lens holder and the lower case to resiliently support the lens holder for movement along the optical axis and biasing the lens holder upwardly into contact with the upper cushion,
the coil sits on an axially upper surface of the flange and is disposed within the magnetic field of the permanent magnet means whereby current passing through the coil generates a magnetic field which reacts with the magnetic field of the permanent magnet means to cause the coil to press downwardly on the flange and move the lens holder against the force of the springs.

2. A lens module according to claim 1, wherein the springs are electrically conductive and lead wires from the coil connect to a source of electrical power via the springs.

3. A lens module according to claim 1, wherein the springs form electrical terminals for the module.

4. A lens module according to claim 1, wherein the springs are leaf type springs.

5. A lens module according to claim 1, wherein each spring has a flat form with an inner edge fixed to the lens holder, an outer edge fixed to the lower case and at least one serpentine finger extending between the inner and outer edges.

6. A lens module according to claim 1, wherein the outer edge of the spring is pressed to the lower case by the magnet housing through an insulating ring.

7. A lens module according to claim 1, wherein the lower end of the lens holder is stepped and has non-stepped portions which separate the inner edges of the springs.

8. A lens module according to claim 1, wherein the flange of the lens holder has two grooves for passage of the lead wires of the coil to the springs.

9. A lens module according to claim 1, wherein the upper portion of the bore of the lens holder has a plurality of axially extending ribs which confront the radially outer surface of the inner wall of the magnet housing across a small air gap to limit tilting of the upper axial end of the lens holder.

10. A lens module according to claim 9, wherein the ribs extend axially the full length of the upper bore portion.

11. A lens module according to claim 9, wherein the ribs extend axially for half of the length of the upper bore portion.

12. A lens module according to claim 1, wherein the upper case and the lower case clamp the magnet housing there between.

13. A lens module according to claim 12, wherein the upper case and lower case have interconnecting legs which join the two cases together.

14. A lens module according to claim 13, wherein the legs of the lower case have an inner vertical groove, the springs have tabs which extend into the grooves and the legs of the upper case have fingers which extend into the grooves and press the tabs against the lower case.

15. A lens module according to claim 1, wherein the upper case and lower case are fixed together by adhesive.

16. A lens module according to claim 1, wherein a lower cushion is fixed to the lower case and arranged to prevent the lower end of the lens holder from making direct contact with the lower case in the fully extended position.

17. A lens module according to claim 16, wherein the upper and lower cushions are formed from a cushion material having a density which is less than the density of the lens holder.

18. A lens module according to claim 17, wherein the cushion material is an elastomeric material.

19. A lens module according to claim 1 wherein the inner wall and top wall of the magnet housing are joined by a tapered region allowing a wider angle of light to reach the lens being carried by the lens holder.

20. A lens module according to claim 1, wherein the springs are magnetic and are attracted to the permanent magnet means to provide a greater force on the lens holder when the lens holder is in the park position.

21. A lens module according to claim 1, wherein the springs provide minimal force on the lens holder when the lens holder is in the park position.

22. A lens module according to claim 1, wherein the lens holder has magnetic objects attached thereto at locations which assist the springs in holding the lens holder against the upper cushion by magnetic attraction with the magnet means.

23. A lens module according to claim 1, wherein the lens holder is of a material exhibiting magnetic properties.

24. A lens module according to claim 1, wherein the lens holder has auxiliary magnets arranged to be magnetically attracted to the magnet housing when the lens holder is in the park position.

25. A lens module according to claim 24, wherein the auxiliary magnets are disposed in the upper end of the lens holder and are magnetically attracted to the top wall when the lens holder is in the park position.

* * * * *